Patented July 19, 1938

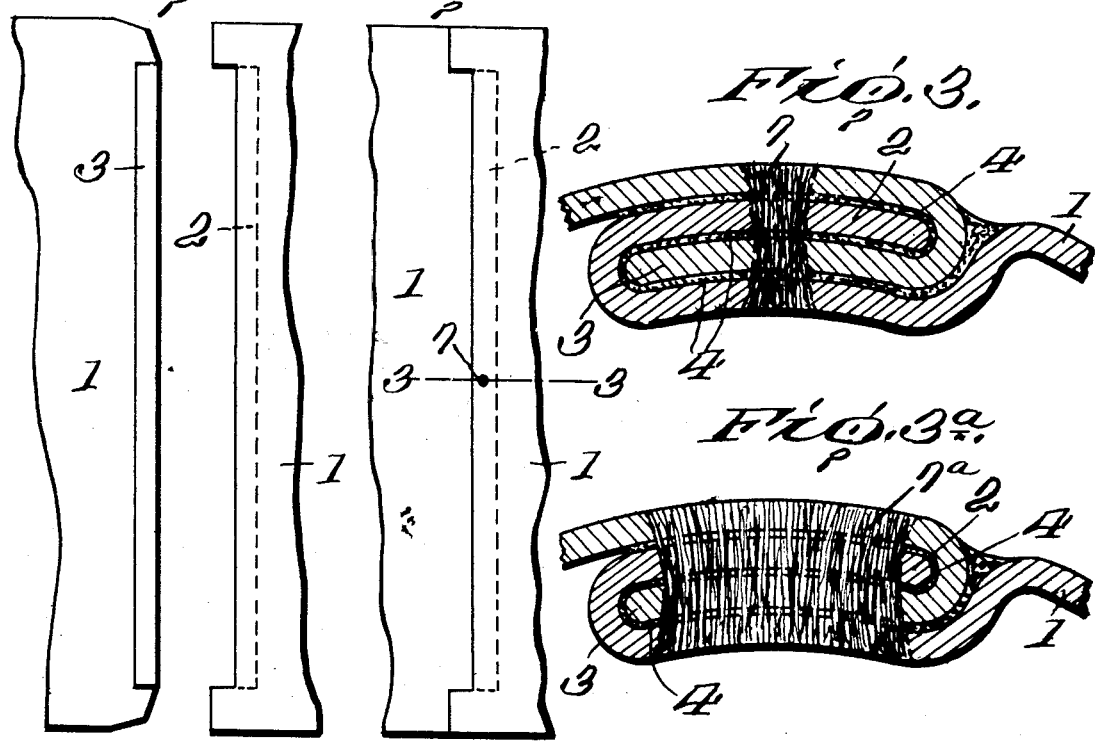
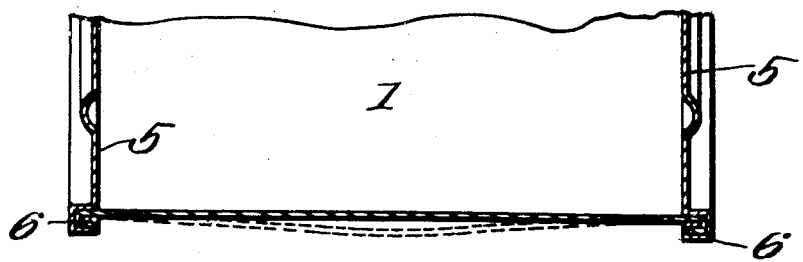
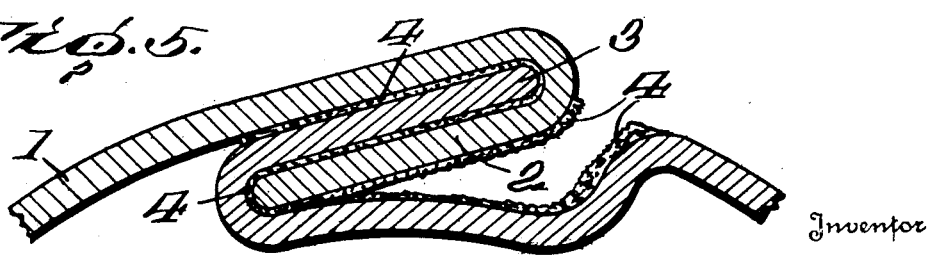

2,124,004

UNITED STATES PATENT OFFICE 2,124,004

SIDE SEAM FOR METAL CAN BODIES

James H. O'Neil, Syracuse, N. Y., assignor to Continental Can Company, Inc., New York, N. Y., a corporation of New York Application August 26, 1935, Serial No. 37,989

1 Claim. (Cl. 220—75)

The invention relates to new and useful improvements in a side seam for a metal can body, and more particularly to a side seam having interlocking hooks.

An object of the invention is to provide a side seam wherein the interfolded metal parts are so firmly united in the region midway between the ends of the side seam as to prevent the outward bowing of the body, under excessive internal pressure, and the rupturing of the solder bond.

In the drawing:

Fig. 1 is a view in side elevation, showing a portion of a can body blank formed with hooks preparatory to interlocking the same.

Fig. 2 is a side elevation of a portion of a can body embodying the invention and as viewed from the inside.

Fig. 3 is a sectional view on the line 3—3 of Fig. 2.

Fig. 3ª is a view similar to Fig. 3, showing a modification of the welding bond.

Fig. 4 is a view showing more or less diagrammatically a can body with the body wall indicated in broken lines as bowed by internal pressure.

Fig. 5 is a transverse sectional view through a ruptured side seam.

In the illustrated embodiment of the invention the can body is produced from a sheet metal blank which is curved into cylindrical form and its edges are joined by a lock and lap side seam.

The body blank 1 is notched and the metal turned back at one end to form the inner hook 2. The other end of the blank is notched and the metal turned back to form the outer hook 3. At the ends of the hooks are the flat portions which overlap and form the lap portions of the side seam. The hooks are interlocked and bumped to bring the interengaged parts into intimate contact.

In the usual form of lock and lap seam molten solder is applied to the outside of the side seam throughout its entire length and will flow by capillary attraction to all parts of the side seam where the metal walls are in close contact, thus forming a solder bond 4.

The ends of the can body are flanged and closure ends 5, 5 are secured thereto by double seaming, as indicated at 6, 6. Such a side seam provides a very efficient hermetic joint so long as the solder bond remains intact.

In the treatment of certain products after sealing the same in a container of the above type an internal pressure is developed which far exceeds the atmospheric pressure on the outer face of the container. For example, when beer is sealed in a container and then subjected to a pasteurizing temperature the internal pressure reaches approximately ninety pounds per square inch. The closure ends and double seams co-operate with the side seam in restraining this outward bulging pressure in the regions adjacent the ends of the side seam. There is no such restraining force in the region centrally between the ends of the side seam. This outward pressure tends to bow the side seam outward, as indicated in broken lines in Fig. 4, resulting at times in the rupturing of the solder bond, as indicated in Fig. 5 and the unfolding of the interlocked hooks.

It has been found that if the contacting metal parts of the side seam midway between the ends thereof be fused together by welding this will provide a restraining force which will prevent the rupturing of the solder bond in the region $a$, and the unfolding of the interlocked hooks.

In Figs. 2 and 3 of the drawing the region of welding and joining the metal parts by fusing is indicated at 7. This is accomplished preferably while the can body is on the horn and between the bumping station and the solder applying means. The region of fusing, as illustrated, is near the curved base of the outer hook 3 and the line where the solder bond is applied. When so located, the welding bond serves to hold the folded parts in close contact, thus insuring the forming of an efficient solder bond. It also places the restraining force close to the point where the rupturing of the solder bond begins.

The welding bond may be extended practically all the way across the side seam, as indicated at 7ª in Fig. 3ª, so that in effect there is an integral continuous band of metal encircling the can body midway between its ends which restrains the bulging internal force and maintains the solder bond intact.

While the welding bond is shown as located centrally of the length of the side seam, welding bonds may be applied at other points. It is the solder bond that forms the hermetic joint and the welding bond or bonds that prevents the initiating of the rupture of the side seam.

The welding bond may be of any character, but should not only join the hooks one to the other, but also the hooks to the adjacent metal parts of the can body, as it is the solder bond joining the inner face of the outer hook to the adjacent metal part of the can body that receives the greatest strain and is likely to rupture.

I claim:—

A metal can body having its edge portions joined by a side seam extending from one end of the body to the other, said side seam including interlocking hooks, a solder bond uniting the contacting metal parts of the side seam throughout the entire length of the side seam, and a welded metal bond located in the side seam midway between the ends thereof, said welded bond being disposed so as to join the hooks to each other and so as to join the hooks to the respective portions of the body wall carrying said hooks whereby a strain internally of the can body tending to rupture the solder bond and unfold the interlocking hooks is resisted by said welded metal bond.

JAMES H. O'NEIL.